US012695996B2

(12) United States Patent
Chou et al.

(10) Patent No.: US 12,695,996 B2
(45) Date of Patent: Jul. 28, 2026

(54) LIGHT-EMITTING DIODE (LED) FLICKER MITIGATION (LFM) USING SPATIALLY MULTIPLEXED IMAGE SENSOR

(71) Applicant: CISTA SYSTEM CORP., Grand Cayman (KY)

(72) Inventors: Yang-Ting Chou, Zhubei City (TW); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 131 days.

(21) Appl. No.: 18/441,919

(22) Filed: Feb. 14, 2024

(65) Prior Publication Data

US 2025/0260904 A1 Aug. 14, 2025

(51) Int. Cl.
*H04N 23/745* (2023.01)
*H04N 23/73* (2023.01)

(52) U.S. Cl.
CPC ........... *H04N 23/745* (2023.01); *H04N 23/73* (2023.01)

(58) Field of Classification Search
CPC .... H04N 23/745; H04N 23/73; H04N 23/741; H04N 23/76
See application file for complete search history.

(56) References Cited

U.S. PATENT DOCUMENTS

2009/0273695 A1* 11/2009 Mabuchi .............. H04N 25/767
                                        348/308
2020/0092458 A1* 3/2020 Wang ................... H04N 23/745
2022/0321759 A1* 10/2022 Miyauchi ............. H04N 25/583

* cited by examiner

*Primary Examiner* — Ahmed A Berhan

(74) *Attorney, Agent, or Firm* — Sheppard Mullin Richter & Hampton LLP

(57) ABSTRACT

This application describes method and apparatus for LED Flicker mitigation (LFM) using spatially multiplexed image sensors with linear exposure configuration and nonlinear gain configuration. An example spatially multiplexed image sensor includes a plurality of pixels, each pixel being divided into M×N sub-pixels, each of the M×N sub-pixels being configured with an exposure time and an analog gain. Within each of the plurality of pixels: the M×N sub-pixels are configured with different exposure times; a first sub-pixel of the M×N sub-pixels is configured with a first exposure time and a first analog gain, and a second sub-pixel of the M×N sub-pixels is configured with a second exposure time and a second analog gain, wherein the first exposure time is longer than the second exposure time, and the first analog gain is smaller than the second analog gain.

19 Claims, 8 Drawing Sheets

L3=1/30
G=1x

L2=1/120
G=1x

L1=1/480
G'=0.25x (¼ of x)

L0=1/1920
G=1x

Sub-pixel 3  Sub-pixel 2
Sub-pixel 1  Sub-pixel 0

A Pixel group of four sub-pixels

Pixel values are accumulated to detect flicker position 510 capturing High Dynamic Range (HDR) frames by using an M×N-cell image sensor, M and N being positive integers greater than one, wherein the M×N-cell image sensor comprises a plurality of pixels, each pixel being divided into M×N sub-pixels, and within each of the plurality of pixels: the M×N sub-pixels are configured with a plurality of different exposure times; and a first sub-pixel of the M×N sub-pixels is configured with a first exposure time and a first analog gain, and a second sub-pixel of the M×N sub-pixels is configured with a second exposure time and a second analog gain, wherein the first exposure time is longer than the second exposure time, and the first analog gain is smaller than the second analog gain;

520 detecting LED flickering based on accumulating a pixel value of the first sub-pixel and a pixel value of the second sub-pixel in the M×N sub-pixels 530 in response to LED flickering being detected, performing LED flickering management (LFM) during HDR fusion of the HDR frames Exposure1 = m*Exposure0; analog_gain1=1/m*analog_gain0

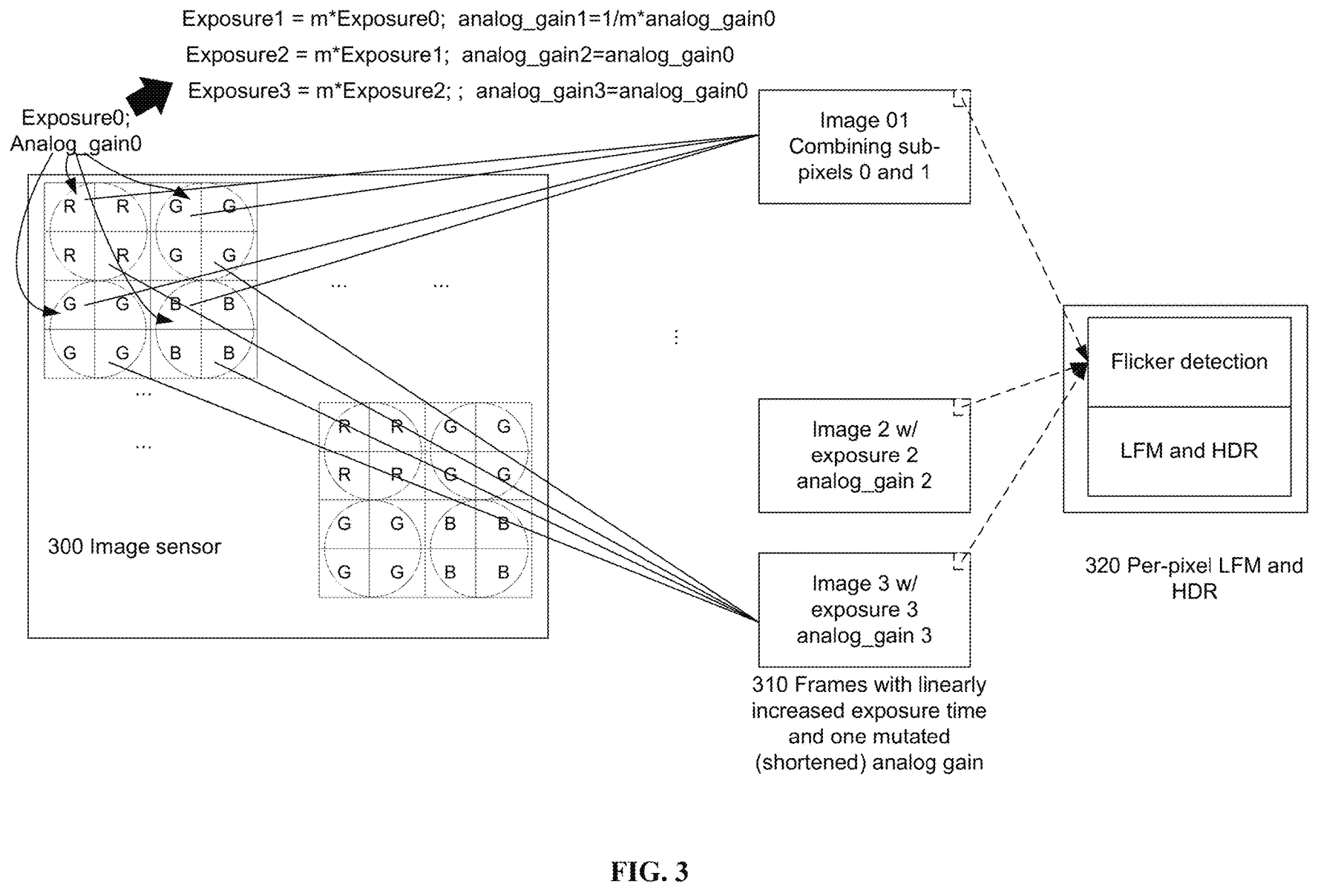

Exposure2 = m*Exposure1; analog_gain2=analog_gain0

Exposure3 = m*Exposure2; ; analog_gain3=analog_gain0

Exposure0;
Analog_gain0

300 Image sensor

Flicker detection

LFM and HDR

320 Per-pixel LFM and HDR

Image 01
Combining sub-
pixels 0 and 1

Image 2 w/
exposure 2
analog_gain 2

Image 3 w/
exposure 3
analog_gain 3

310 Frames with linearly
increased exposure time
and one mutated
(shortened) analog gain

FIG. 3

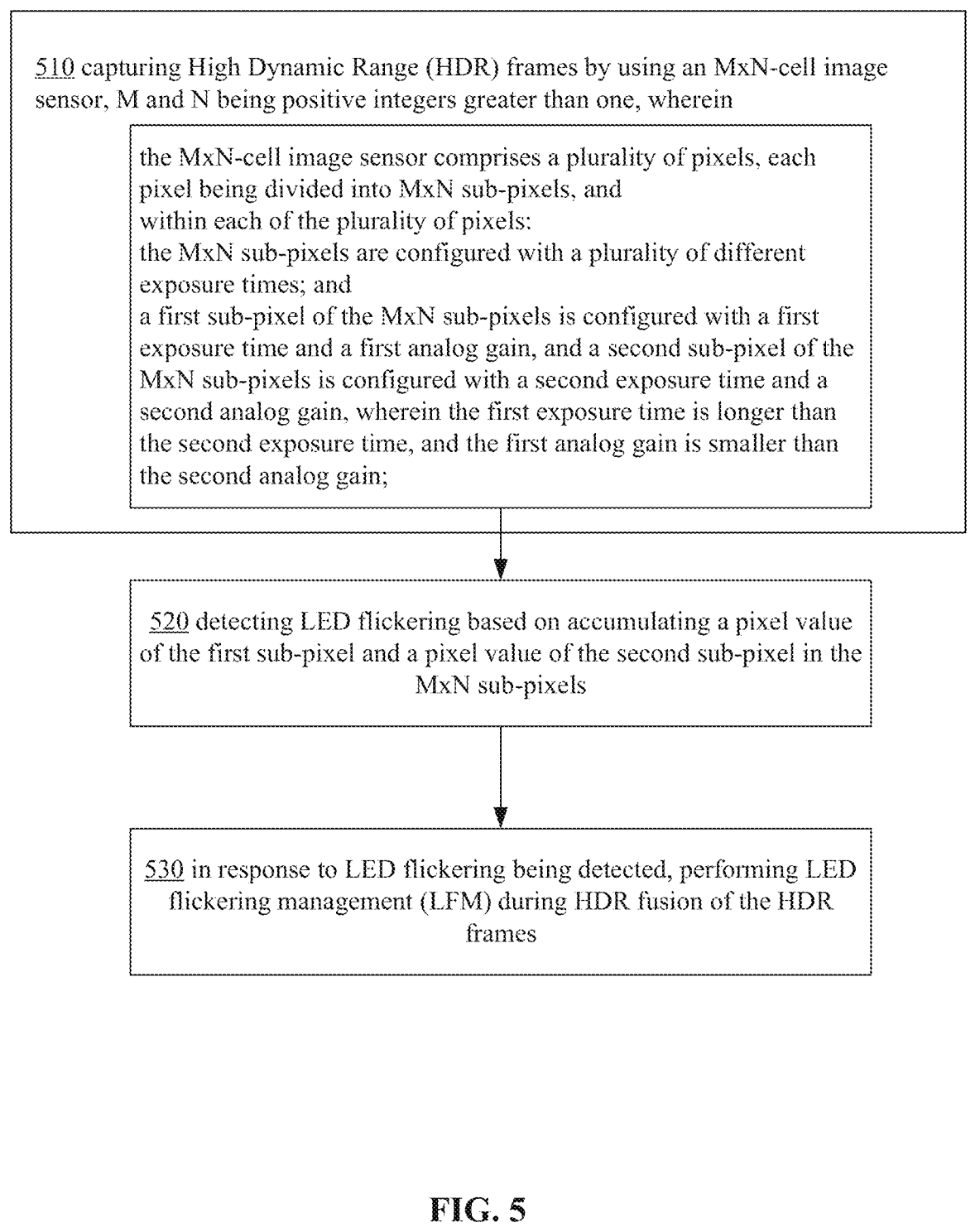

510 capturing High Dynamic Range (HDR) frames by using an MxN-cell image sensor, M and N being positive integers greater than one, wherein the MxN-cell image sensor comprises a plurality of pixels, each pixel being divided into MxN sub-pixels, and
within each of the plurality of pixels:
the MxN sub-pixels are configured with a plurality of different exposure times; and
a first sub-pixel of the MxN sub-pixels is configured with a first exposure time and a first analog gain, and a second sub-pixel of the MxN sub-pixels is configured with a second exposure time and a second analog gain, wherein the first exposure time is longer than the second exposure time, and the first analog gain is smaller than the second analog gain;

520 detecting LED flickering based on accumulating a pixel value of the first sub-pixel and a pixel value of the second sub-pixel in the MxN sub-pixels 530 in response to LED flickering being detected, performing LED flickering management (LFM) during HDR fusion of the HDR frames

FIG. 5

LIGHT-EMITTING DIODE (LED) FLICKER MITIGATION (LFM) USING SPATIALLY MULTIPLEXED IMAGE SENSOR

TECHNICAL FIELD

The disclosure relates generally to apparatus, system, and method for Light-Emitting Diode (LED) Flicker Mitigation (LFM) using spatially multiplexed image sensors.

BACKGROUND

LEDs, or Light Emitting Diodes, emit light in pulses rather than a continuous stream. This pulsating emission is controlled using a technique called Pulse Width Modulation (PWM) at a specific frequency. PWM involves turning the LED on and off rapidly, and the duration for which the LED is on during each cycle determines its brightness. In the context of capturing LED emissions, digital sensors like CMOS (Complementary Metal-Oxide-Semiconductor) cameras use exposure time, which is the duration for which the sensor is exposed to light, to capture these light pulses.

In this scenario, the exposure time of the CMOS sensor is synchronized with the PWM cycle of the LED. This synchronization ensures that the sensor captures the LED emissions accurately. To obtain comprehensive and precise information about the LED light, it's crucial for the exposure time of the CMOS sensor to cover the entire cycle of the PWM. This means that the exposure time should encompass both the LED's on and off periods within a single PWM cycle.

However, a challenge arises because the specific frequency of the LED's PWM cycle is often unknown or not readily available. Without this information, it becomes difficult to precisely match the exposure time of the CMOS sensor to the LED's PWM cycle. This lack of knowledge about the LED's frequency complicates the task of ensuring the sensor captures the complete LED cycle, leading to potential gaps in the data captured by the camera sensor.

This application describes a novel solution to address the above-identified challenges in LFM using spatially multiplexed image sensors, such as M×N cell sensor, where M and N are integers greater than 1.

SUMMARY

Various embodiments of this specification may include hardware circuits, systems, and methods for LFM using an M×N cell image sensors with M×N-k exposures and k analog gains for LED flicker mitigation, where k is a positive integer greater than 0.

In some aspects, the techniques described in this context revolve around an M×N-cell image sensor. The M×N-cell image sensor may include a plurality of pixels, each pixel being divided into M×N sub-pixels, and each of the M×N sub-pixels being configured with an exposure time and an analog gain, where M and N are positive integers greater than one. Within each of the plurality of pixels: the M×N sub-pixels are configured with a plurality of different exposure times; and a first sub-pixel of the M×N sub-pixels is configured with a first exposure time and a first analog gain, and a second sub-pixel of the M×N sub-pixels is configured with a second exposure time and a second analog gain, where the first exposure time is longer than the second exposure time, and the first analog gain is smaller than the second analog gain.

In some embodiments, the first sub-pixel is a sub-pixel with a second shortest exposure time among the M×N sub-pixels, and the second sub-pixel is a sub-pixel with a shortest exposure time among the M×N sub-pixels.

In some embodiments, the first exposure time of the first sub-pixel is m times greater than the second exposure time of the second sub-pixel, wherein m is an integer greater than one, and the first analog gain of the first sub-pixel is configured as $$\frac{1}{m}th$$

of the second analog gain of the second sub-pixel.

In some embodiments, a product of the first exposure time and the first analog gain is the same as a product of the second exposure time and the second analog gain.

In some embodiments, the image sensor includes a processor configured to: accumulate pixel values of the first sub-pixel and the second sub-pixel to obtain an intermediate pixel value, thereby detecting different flicker positions through different exposure times.

In some embodiments, the processor may further be configured to perform High Dynamic Range (HDR) fusion of the intermediate pixel value and pixel values of other M×N sub-pixels when flicker is not detected.

In some embodiments, the processor may further be configured to perform LED flicker mitigation (LFM) during HDR fusion of the intermediate pixel value and pixel values of other M×N sub-pixels when a flicker is detected.

In some embodiments, the M×N sub-pixels are configured with linearly increasing exposure times.

In some embodiments, except for the first sub-pixel, all other sub-pixels in the M×N sub-pixels are configured with the second analog gain.

In some aspects, the techniques described in this context are directed to an LED flicker mitigation (LFM) method. The method may include capturing High Dynamic Range (HDR) frames by using an M×N-cell image sensor, M and N being positive integers greater than one, wherein: the M×N-cell image sensor includes a plurality of pixels, each pixel being divided into M×N sub-pixels, and within each of the plurality of pixels: the M×N sub-pixels are configured with a plurality of different exposure times; and a first sub-pixel of the M×N sub-pixels is configured with a first exposure time and a first analog gain, and a second sub-pixel of the M×N sub-pixels is configured with a second exposure time and a second analog gain, where the first exposure time is longer than the second exposure time, and the first analog gain is smaller than the second analog gain; detecting LED flickering based on accumulating a pixel value of the first sub-pixel and a pixel value of the second sub-pixel in the M×N sub-pixels; and in response to LED flickering being detected, performing LED flicker mitigation (LFM) during HDR fusion of the HDR frames.

In some aspects, the techniques described in this context are directed to an non-transitory computer-readable storage medium. The non-transitory computer-readable storage medium is configured with instructions executable by one or more processors to cause the one or more processors to perform operations including: capturing High Dynamic Range (HDR) frames by using an M×N-cell image sensor, M and N being positive integers greater than one, wherein: the M×N-cell image sensor includes a plurality of pixels, each pixel being divided into M×N sub-pixels, within each of the plurality of pixels: the M×N sub-pixels are configured with a plurality of different exposure times; and a first sub-pixel of the M×N sub-pixels is configured with a first exposure time and a first analog gain, and a second sub-pixel of the M×N sub-pixels is configured with a second exposure time and a second analog gain, where the first exposure time is longer than the second exposure time, and the first analog gain is smaller than the second analog gain; detecting LED flickering based at least on accumulating a pixel value of the first sub-pixel and a pixel value of the second sub-pixel in the M×N sub-pixels; and based on the detected LED flickering, performing LED flicker mitigation (LFM) during HDR fusion of the HDR frames.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 3 illustrates a diagram of an example LFM using an M×N-cell image sensor with M×N-k exposure settings and k analog gain settings, according to some embodiments of this specification.

FIG. 5 illustrates an exemplary method for LFM using an M×N-cell image sensor with M×N-k exposure settings and k analog gain settings, according to some embodiments of this specification.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown, but is to be accorded the widest scope consistent with the principles and features disclosed herein.

There are various ways to implement LFM, either on the LED side or on the image sensor side. For example, LED-based LFM methods may include increasing the PWM frequency, using a continuous current to power LEDs instead of PWM to eliminate flicker entirely, etc., Image sensor-based LFM methods may include synchronizing the exposure time of the image sensor with the frequency of the LED flickering, adaptive exposure control where the exposure time of the sensor is adjusted dynamically based on the detected frequency of LED flickering, etc. This application focuses on the image sensor-based LFM methods (i.e., LFM on the sensor side).

Figure 1A:
FIG. 1A illustrates capturing a scene of LED light source(s) using an image sensor with different exposure settings.

FIG. 1A illustrates capturing a scene of LED light source(s) using an image sensor with different exposure settings. As explained in the background section, flickering is a common occurrence in LED light sources, such as traffic signals and signboards, due to their repetitive ON/OFF cycles. These fluctuations in light intensity, although not visible to the human eye, can be detected by sensors designed to pick up such flickers. When exposed to these fluctuations, sensors may incorrectly interpret the working condition of LED light sources, adversely affecting the performance of embedded vision systems.

For example, autonomous vehicles rely on cameras to detect and interpret traffic signals, including those illuminated by LED lights; many urban areas now use LED streetlights for energy efficiency. Autonomous vehicles navigating roads at night encounter different street lighting conditions, including flickering LED lights. Surveillance cameras in public places like airports, train stations, and shopping malls might encounter flickering LED lights from various sources, such as display panels, advertising boards, or decorative lighting. Modern sports arenas use LED lighting systems for energy efficiency. Cameras capturing live sports events need to contend with the flickering caused by these LED lights.

As shown in FIG. 1A, the LED Pulse Width Modulation (PWM) has ON/OFF cycles. An image sensor with a long exposure time (e.g., Exp3) has a better chance to capture more ON cycles of the LED light source, yielding a more accurate representation of the light source's true operational state. Conversely, another image sensor with a shorter exposure time (e.g., Exp2 or Exp0) may miss some of the On cycles of the LED light source, leading to an inconsistent depiction of the LED's illumination. In other words, setting a longer exposure time allows the sensor to collect light over an extended period, increasing the probability of capturing more ON cycles of the LED. This results in a more stable and continuous illumination representation in the captured image.

However, despite the advantages of longer exposure times, there are disadvantages to consider for only using long exposures to capture LED flickers. Longer exposures lead to the sensor capturing more light, potentially causing overexposure. Overexposed images lose details in bright areas, significantly impacting image quality. Moreover, in environments with varying light sources, longer exposures might introduce motion blur or capture unintended light sources, further complicating the image capture process. Given these practical limitations, relying solely on longer exposure times for LED LFM purposes is not practical.

Figure 1B:
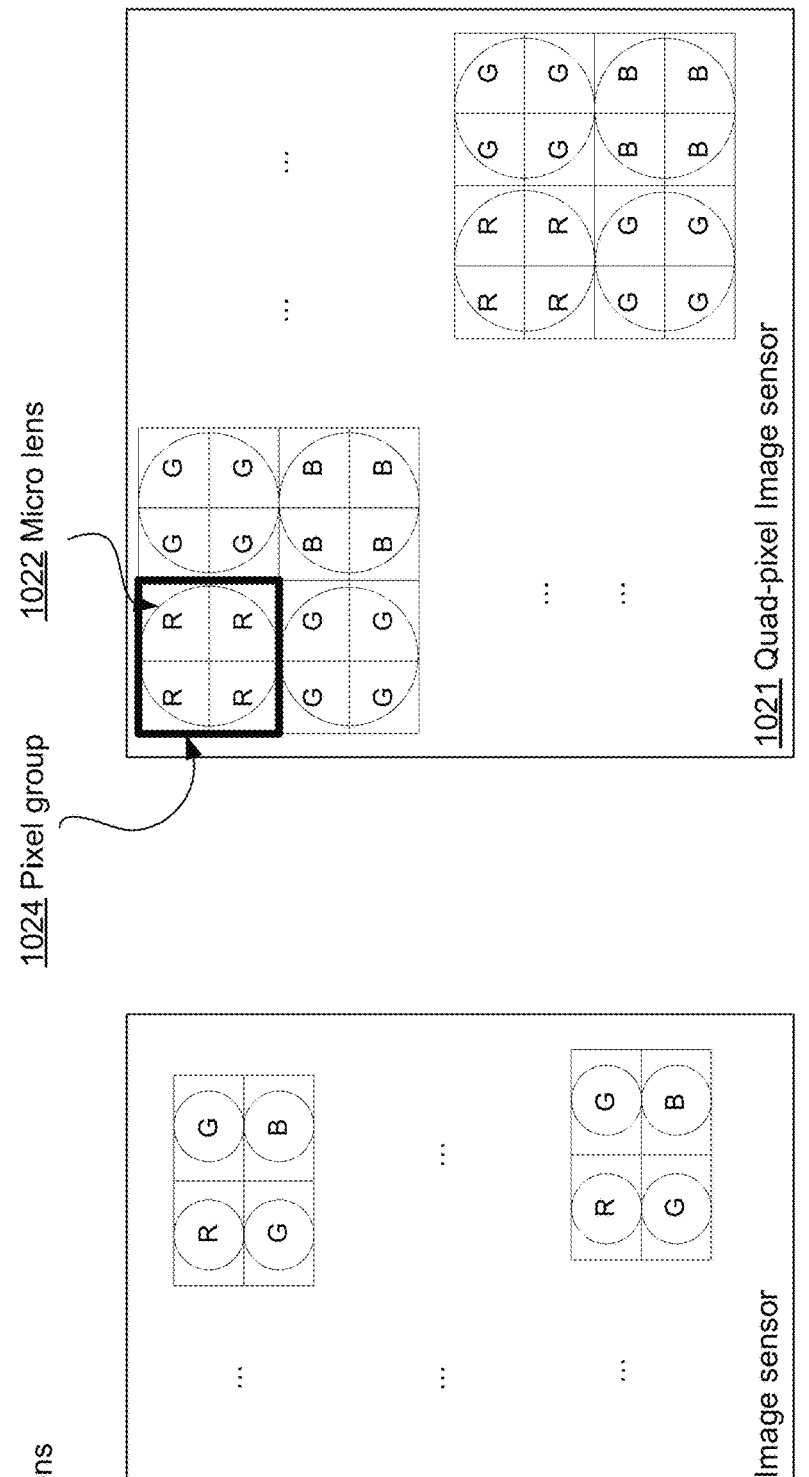
FIG. 1B illustrates exemplary spatially multiplexed image sensors, according to some embodiments of this specification.

FIG. 1B illustrates exemplary spatially multiplexed image sensors, according to some embodiments of this specification. A spatially multiplexed image sensor may have a matrix of pixels in a group. A common example is quad-pixel image sensor with quad-pixel units, also called qua-druples (or quad), each of which includes four sensor pixels arranged in a square or rectangular pattern. Even though FIG. 1B uses quad-pixel image sensors as an example, the description is applicable to M×N-cell image sensors with each pixel group including M×N sub-pixels.

In some embodiments, the sensor pixels within the same group capture the different colors (using different color filters), such as the single-pixel image sensor 1011. In some embodiments, the sensor pixels within the same group capture the same color (using the same color filters), such as the quad-pixel image sensor 1021.

Each spatially multiplexed image sensor may include a plurality of microlenses or photosites covering the sensor sub-pixels. A microlens is a small lens designed to focus light onto a corresponding pixel beneath it. The size of a microlens may vary, particularly in high-resolution sensors with small pixel dimensions, and can be on the order of a few micrometers (μm) to align with the scale of the pixels it serves. A typical microlens may be a single element with one flat surface and one curved (e.g., spherical convex or other shapes) surface to refract the light. The plurality of micro-lenses are sometimes arranged as an array, such as a one-dimensional or two-dimensional array on a supporting sub-strate. Single micro-lenses may be used to couple light to the covered sensor sub-pixels or photodiodes; microlens arrays may be used to increase the light collection efficiency of CCD or CMOS image sensors, to collect and focus light that would have otherwise fallen onto the non-sensitive areas of the sensors.

Different spatially multiplexed image sensors may have different microlens configurations for each pixel group. FIG. 1C illustrates a single-pixel microlens configuration in the image sensor 1011, and a quad-pixel microlens configura-tion in the image sensor 1021. In the single-pixel microlens configuration, the sensor pixels in the image sensor 1011 are respectively covered by microlenses 1012 for coupling lights to the covered sensor sub-pixels. In contrast, in the quad-pixel microlens configuration, one microlens 1022 is configured to cover a two-by-two matrix of sensor pixels 1024 (also called a pixel group), and the sensor pixels in the pixel group 1024 are covered with color filters of the same color.

The following figures and descriptions introduce the LFM method using a spatially multiplexed M×N-cell image sen-sor. For simplicity, the LFM method assumes that the spatially multiplexed image sensor can have different expo-sure configurations at sub-pixel-level, regarding less how the sub-pixels or microlenses are configured.

Note that the term "pixels" in this description may have different meaning depending on the context. When the term "pixels" refers to the basic physical elements in an image sensor, it may be understood as sensor pixels, photosites, or CCD or CMOS sensors. Each of such physical pixel in the sensor is a photodetector that captures light photons.

The term "pixels" may also be used to refer to the smallest unit of a digital image displayed on screens like computer monitors, TVs, or smartphone displays. Each pixel in an image represents a specific color and brightness at a specific point in the image. A person skilled in the art reading this application would appreciate when the term "pixels" are (1) physical components that capture light and convert it into electrical signals, forming the raw data for an image, or (2) elements of a screen that render this data visually as part of a digital image.

Figure 2A:
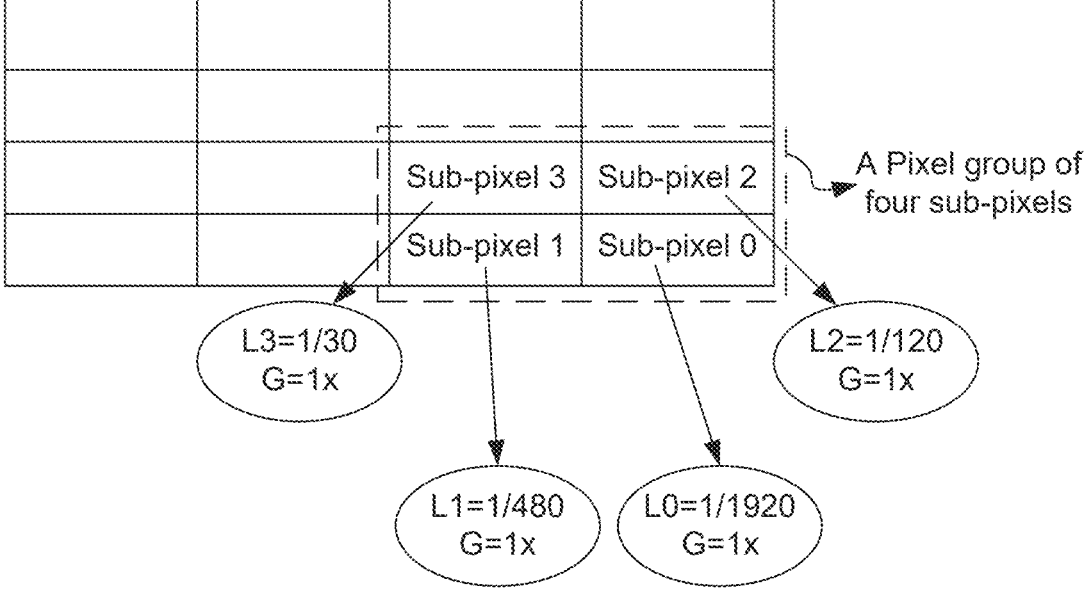
FIG. 2A illustrates a traditional configuration of an M×N-cell image sensor with M×N exposure settings and a uniform analog gain setting for LFM, according to some embodiments of this specification.

FIG. 2A illustrates a traditional configuration of an M×N-cell image sensor with M×N exposure settings and a uniform analog gain setting for LFM, according to some embodi-ments of this specification. Here, analog gain refers to the amplification of the analog signal generated by the image sensor in response to incoming light, and may be in the form of a factor applied to the analog signal to increase its strength before it is converted into a digital signal.

While existing technologies allow setting analog gain at pixel-level for per-pixel analog gain control or pixel-level gain adjustment, implementing per-pixel analog gain control can be technically complex and may require additional circuitry and processing capabilities. It's a feature often found in advanced image sensor designs, such as those used in high-end cameras or scientific imaging applications. FIG. 2A illustrates a typical exposure-gain configuration of a quad-pixel image sensor, which contains a plurality of pixel groups, each pixel group including 2×2 sub-pixels.

In this configuration, the sub-pixels within each pixel group are configured with different exposure times but the same analog gain factor. For instance, sub-pixel 0 is con-figured with exposure time of $1/1920$($1/1920$th of a second) and analog gain of 1× (no amplification), sub-pixel 1 is config-ured with exposure time of $1/480$ and analog gain of 1×, sub-pixel 2 is configured with exposure time of $1/120$ and analog gain of 1×, and sub-pixel 3 is configured with exposure time of $1/30$ and analog gain of 1×. Thus, sub-pixel 3 has the longest exposure time in this configuration.

As explained above, pixels with longer exposure times stand a better chance of capturing LED flicker, whereas pixels with shorter exposure times help prevent overexpo-sure. The configuration of these sub-pixels with varying exposure times facilitates effective LFM and HDR fusion. By combining the pixel values from these sub-pixels, such as through HDR fusion of the HDR frames, the final HDR image may capture LED flicker accurately and mitigate the excessive brightness resulting from longer exposure times. The application of a uniform analog gain factor across all sub-pixels also streamlines the HDR fusion process, simpli-fying pixel value normalization by requiring consideration only for exposure times.

Figure 2B:
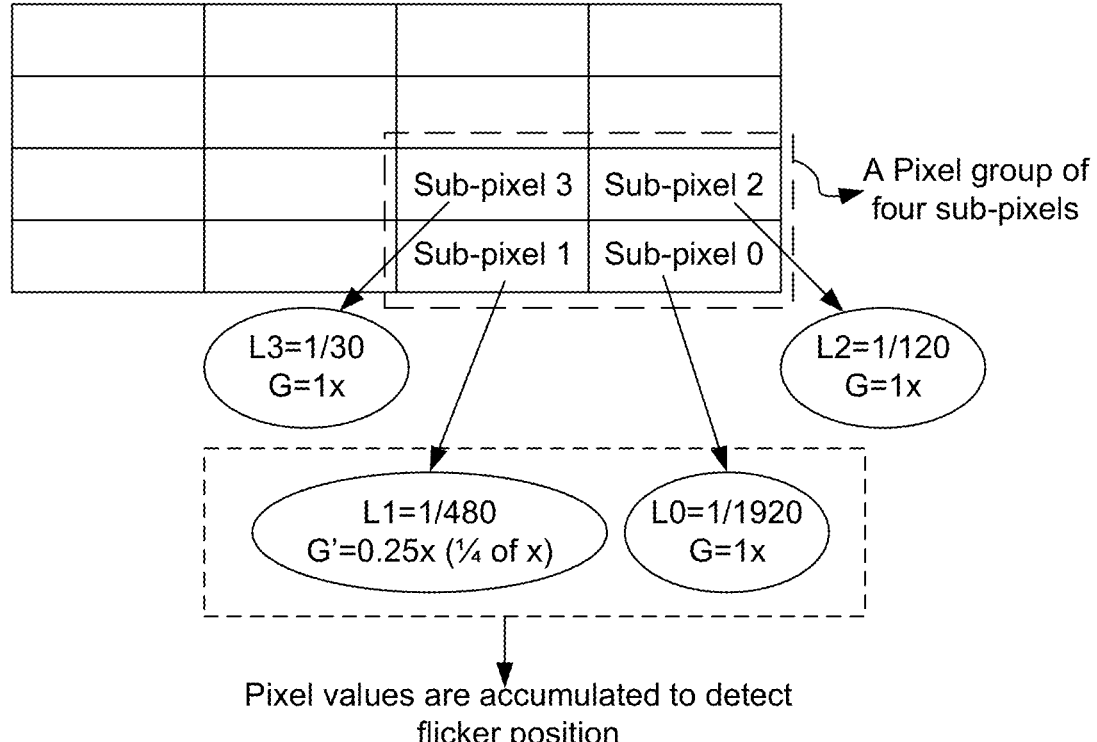
FIG. 2B illustrates an example configuration of an M×N-cell image sensor with M×N-k exposure settings and k analog gain settings for LFM, according to some embodiments of this specification.

FIG. 2B illustrates an example configuration of an M×N-cell image sensor with M×N-k exposure settings and k analog gain settings for LFM, according to some embodi-ments of this specification. The exposure-gain configuration demonstrates the novelty of the design. Similar to the configuration in FIG. 2A, each pixel group in the quad-pixel image sensor in FIG. 2B has four sub-pixels configured with four different exposure times. The difference is that, one of the sub-pixels is configured with a shorter analog gain than other sub-pixels.

In the example illustrated in FIG. 2B, sub-pixel 0 is configured with exposure time of $1/1920$($1/1920$th of a second) and analog gain of 1× (no amplification), sub-pixel 1 is configured with exposure time of $1/480$ and analog gain of $1/4$× ($1/4$ of amplification), sub-pixel 2 is configured with expo-sure time of $1/120$ and analog gain of 1×, and sub-pixel 3 is configured with exposure time of $1/30$ and analog gain of 1×. In other words, sub-pixel 1 has a mutated analog gain compared to the other sub-pixels in the same pixel group. The purpose of this configuration is to make the total energy of sub-pixel 0 and sub-pixel 1 the same. Here, the energy is computed as a product of the exposure time and the analog gain. For instance, the energy of sub-pixel 0 is $$\frac{1}{1920} * 1 = \frac{1}{1920},$$

and the energy of sub-pixel 1 is also $$\frac{1}{480} * \frac{1}{4} = \frac{1}{1920}.$$

Between sub-pixel 0 and sub-pixel 1, sub-pixel 1, with its longer exposure time, stands a greater chance of capturing LED flicker. Given that the pixel value of sub-pixel 1 is adjusted down by ¼, it automatically undergoes normalization with the pixel value of sub-pixel 0. In some embodiments, the pixel values of sub-pixel 1 and sub-pixel 0 are accumulated to form a new pixel value (also called the intermediate pixel value) before engaging LFM and HDR fusion with other sub-pixels (e.g., sub-pixel 2 and sub-pixel 3). The accumulation of sub-pixel 1 and sub-pixel 0 serves the purpose of capturing different flicker positions facilitated by distinct exposure times. Because of the equal energy between sub-pixel 0 and sub-pixel 1, the flickering phenomenon is slowed down through accumulation. Consequently, during LFM and HDR fusion, the example in FIG. 2B effectively involves three pixel values, as opposed to four pixel values in the example of FIG. 2A.

Note that this is only one example configuration, a person skilled in the art would appreciate that the sub-pixel with the mutated analog gain could be any one of the sub-pixels except for the sub-pixel with the shortest exposure time (here, sub-pixel 0) if the mutated analog gain is smaller than 1×. In other embodiments, there may be more than one sub-pixels configured with mutated analog gains, as long as each of them has a corresponding sub-pixel with the same energy for pixel value accumulation.

To illustrate this process in a more general context, consider the use of an M×N-cell image sensor. In this scenario, each pixel group with M×N sub-pixels may have k (k is an integer greater than 1) of the sub-pixels configured with mutated analog gains and different exposure times, with the condition that each of these k sub-pixels has a corresponding sub-pixel in the pixel group with the same energy. Then the pixel values of these k sub-pixels and their corresponding sub-pixels are accumulated to generate the intermediate pixel values for LFM and HDR. The combination effectively reduces the number of exposure time setting to M×N-k. Consequently, this approach is also called M×N-k exposure settings with k analog gain settings (e.g., k sub-pixels are configured with mutated analog gains).

FIG. 3 illustrates a diagram of an example LFM using an M×N-cell image sensor 300 with M×N-k exposure settings and k analog gain settings, according to some embodiments of this specification.

In some embodiments, the M×N-cell image sensor 300 includes a plurality of pixels (or called pixel groups), each pixel being divided into M×N sub-pixels, and each of the M×N sub-pixels being configured with an exposure time and an analog gain. Within each of the pixels, the M×N sub-pixels are configured with different exposure times. In addition, a first sub-pixel of the M×N sub-pixels is configured with a first exposure time and a first analog gain, and a second sub-pixel of the M×N sub-pixels is configured with a second exposure time and a second analog gain, the first exposure time is longer than the second exposure time, and the first analog gain is smaller than the second analog gain.

Using the equal-pixel image sensor 300 in FIG. 3 as an example, the four sub-pixels in each pixel may be configured with linearly increasing exposure times, with sub-pixel 0 having the shortest exposure time Exposure0, sub-pixel 1 being configured with Exposure1=m*Exposure0, sub-pixel 2 being configured with Exposure2=m*Exposure1, and sub-pixel 3 being configured with Exposure3=m*Exposure2, where m is a parameter greater than 1.

Among the four sub-pixels, the sub-pixel with the second shortest exposure time is configured with a mutated or decreased analog gain in comparison with the other sub-pixels. As shown in FIG. 3, sub-pixels 0, 2, and 3 all have the same analog_gain0, whereas sub-pixel1 has a decreased analog gain of $$\frac{1}{m} * analog\_gain0.$$

When using the image sensor 300 to capture a scene, the pixel values of sub-pixels 0 and 1 may be accumulated into an intermediate pixel value. The accumulation allows the higher chance of capturing LED flicker in a more accurate way (more details are explained in FIG. 4). The accumulation of pixel values of sub-pixels 0 and 1 is simplified because the total energy (e.g., exposure times analog gain) of sub-pixel 0 and sub-pixel 1 are the same, which indicate that the pixel values of these two sub-pixels are inherently normalized.

Because of the accumulation, the HDR frames 310 captured by each pixel group in the image sensor 300 include three frames (with frames 0 and 1 being merged), rather than four frames. The three HDR frames 310 may then be fed into regular flicker detection, followed by LFM and HDR process 320 to achieve per-pixel LFM at step 320.

During the per-pixel LFM at step 320, if an LED flicker is detected, LFM process may be triggered to reflect the LED flicker in the final HDR image. If no LED flicker is detected, regular HDR fusion process may be executed to fusion the HDR frames.

Figure 4:
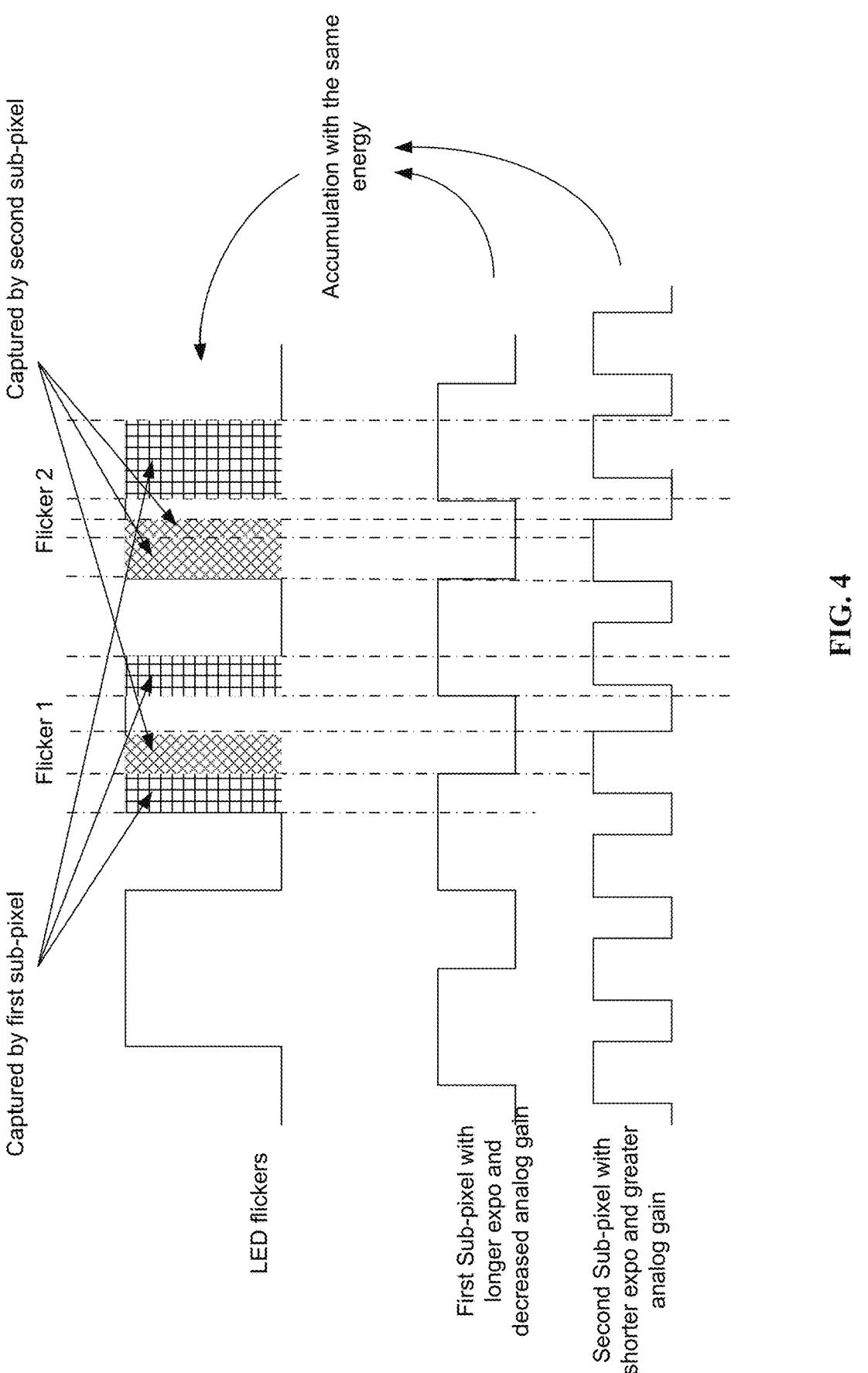
FIG. 4 illustrates an example technical improvement of LFM using an M×N-cell image sensor with M×N-k exposure settings and k analog gain settings, according to some embodiments of this specification.

FIG. 4 illustrates an example technical improvement of LFM using an M×N-cell image sensor with M×N-k exposure settings and k analog gain settings, according to some embodiments of this specification. The accumulation of the pixel values of the sub-pixel with a decreased analog gain with the corresponding sub-pixel with the regular analog gain (as other sub-pixels) not only capture flicker positions through different exposure times, it may also capture more information about the flicker when both sub-pixels capture a partial LED flicker.

As shown in FIG. 4, during Flicker 1, the first sub-pixel with longer exposure time may capture two sections of the flicker, and the second sub-pixel with the shorter exposure time may capture a different section of the flicker. Thus, accumulating these pixel values effectively combines the captured sections, resulting a more accurate depiction of the flicker. The same scenario occurs for Flicker 2. The accumulation does not incur extra computing power at least because the sub-pixels have the same energy, due to the decreased analog gain of the first sub-pixel.

The accumulation of the pixel values of the sub-pixels with the same energy is different from the pixel fusion in the HDR fusion process, at least because the pixel values of the sub-pixels are inherently normalized by the mutated analog gain, whereas HDR fusion requires extra normalization during the fusion.

FIG. 5 illustrates an exemplary method for LFM using an M×N-cell image sensor with M×N-k exposure settings and k analog gain settings, according to some embodiments of this specification. The steps 510-530 illustrated in FIG. 5 are for illustration purposes. Depending on the implementation, the method 500 may include fewer, more, or alternative steps.

As shown in FIG. 5, step 510 of method 500 includes capturing High Dynamic Range (HDR) frames by using an M×N-cell image sensor, M and N being positive integers greater than one. The M×N-cell image sensor includes a plurality of pixels, each pixel being divided into M×N sub-pixels, and within each of the plurality of pixels: the M×N sub-pixels are configured with a plurality of different exposure times; and a first sub-pixel of the M×N sub-pixels is configured with a first exposure time and a first analog gain, and a second sub-pixel of the M×N sub-pixels is configured with a second exposure time and a second analog gain, where the first exposure time is longer than the second exposure time, and the first analog gain is smaller than the second analog gain.

Step 520 includes detecting LED flickering based on accumulating a pixel value of the first sub-pixel and a pixel value of the second sub-pixel in the M×N sub-pixels.

Step 530 includes in response to LED flickering being detected, performing LED flicker mitigation (LFM) during HDR fusion of the HDR frames.

In some embodiments, except for the first sub-pixel, all other sub-pixels in the M×N sub-pixels are configured with the second analog gain.

In some embodiments, the first sub-pixel is a sub-pixel that has a second shortest exposure time among the M×N sub-pixels, and the second sub-pixel is a sub-pixel with a shortest exposure time among the M×N sub-pixels.

In some embodiments, the first exposure time of the first sub-pixel is m times greater than the second exposure time of the second sub-pixel, wherein m is an integer greater than one, and the first analog gain of the first sub-pixel is configured as 1/mth of the second analog gain of the second sub-pixel, wherein the pixel value of the first sub-pixel is determined based on the first exposure time and the first analog gain, and the pixel value of the second sub-pixel is determined based on the second exposure time and the second analog gain.

In some embodiments, the performing LFM during fusion of the HDR frames includes: performing LFM at pixels that captured the LED flickering, and performing HDR fusion at pixels that did not capture the LED flickering.

In some embodiments, the M×N sub-pixels are configured with linearly increasing exposure times.

In some embodiments, a product of the first exposure time and the first analog gain is the same as a product of the second exposure time and the second analog gain.

In some embodiments, the method 500 may further include accumulating pixel values of the first sub-pixel and the second sub-pixel to obtain an intermediate pixel value, thereby detecting different flicker positions through different exposure times.

In some embodiments, the method 500 may further include performing High Dynamic Range (HDR) fusion of the intermediate pixel value and pixel values of other M×N sub-pixels when flicker is not detected.

In some embodiments, the method 500 may further include performing LED flicker mitigation (LFM) during HDR fusion of the intermediate pixel value and pixel values of other M×N sub-pixels when a flicker is detected.

Figure 6:
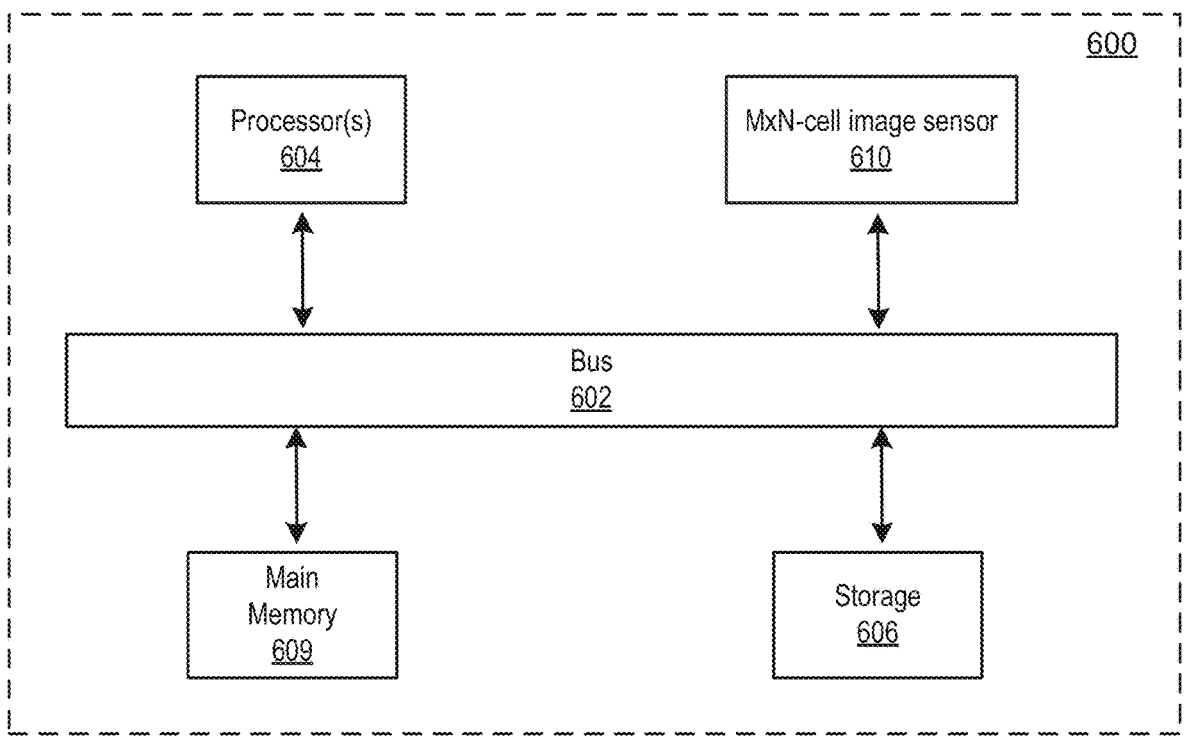
FIG. 6 is a schematic diagram of an example computing system for LFM using an M×N-cell image sensor with M×N-k exposure settings and k analog gain settings, according to some embodiments of this specification.

FIG. 6 is a schematic diagram of an example computing system 600 for LFM using an M×N-cell image sensor with M×N-k exposure settings and k analog gain settings, according to some embodiments of this specification. The computer system 600 may be implemented in any of the components of the systems illustrated in FIGS. 1-5. One or more of the example methods illustrated by FIGS. 1-5 may be performed by one or more implementations of the computer system 600.

The computer system 600 may include a bus 602 or another communication mechanism for communicating information, and one or more hardware processor(s) 604 coupled with bus 602 for processing information. Hardware processor(s) 604 may be, for example, one or more general purpose microprocessors.

The computer system 600 may also include a main memory 609, such as a random-access memory (RAM), cache and/or other dynamic storage devices, coupled to bus 602 for storing information and instructions executable by processor(s) 604. Main memory 609 also may be used for storing temporary variables or other intermediate information during execution of instructions by processor(s) 604. Such instructions, when stored in storage media accessible to processor(s) 604, render computer system 600 into a special-purpose machine that is customized to perform the operations specified in the instructions. The computer system 600 may further include a read only memory (ROM) 609 or other static storage device coupled to bus 602 for storing static information and instructions for processor(s) 604. A storage device 606, such as a magnetic disk, optical disk, or USB thumb drive (flash drive), etc., may be provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 609. Such instructions may be read into main memory 609 from another storage medium, such as storage device 606. Execution of the sequences of instructions contained in main memory 609 may cause processor(s) 604 to perform the process steps described herein. In alternative embodiments, hard-wired circuitry may be used in place of or in combination with software instructions.

The main memory 609, the ROM 609, and/or the storage device 606 may include non-transitory storage media. The term "non-transitory media," and similar terms, as used herein refers to media that stores data and/or instructions that cause a machine to operate in a specific fashion, that excludes transitory signals. Such non-transitory media may comprise non-volatile media and/or volatile media. Non-volatile media includes, for example, optical or magnetic disks, such as storage device 606. Volatile media includes dynamic memory, such as main memory 609. Common forms of non-transitory media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge, and networked versions of the same.

The computer system 600 may include a M×N-cell image sensor 610 (or generally called spatially multiplexed image sensor) coupled to bus 602. The M×N-cell image sensor 610 may include a plurality of pixel groups, each pixel group having a M×N pixels configured with color filters of a same color such that the M×N pixels in each pixel group capture a same color.

The computer system 600 can send messages and receive data, including program code, through the network(s), network link, and M×N-cell image sensor 610. In the Internet example, a server might transmit a requested code for an application program through the Internet, the ISP, the local network, and the M×N-cell image sensor 610.

The received code may be executed by processor(s) 604 as it is received, and/or stored in storage device 606, or other non-volatile storage for later execution.

Each process, method, and algorithm described in the preceding sections may be embodied in, and fully or partially automated by, code modules executed by one or more computer systems or computer processors comprising computer hardware. The processes and algorithms may be implemented partially or wholly in the application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions that cause a computing device (which may be a personal computer, a server, a network device, and the like) to execute all or some steps of the methods of the embodiments of the present application. The storage medium may comprise a flash drive, a portable hard drive, a ROM, a RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted or executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. An M×N-cell image sensor, comprising:
a plurality of pixels, each pixel being divided into M×N sub-pixels, and each of the M×N sub-pixels being configured with an exposure time and an analog gain, wherein M and N are positive integers greater than one;
wherein:
within each of the plurality of pixels:
the M×N sub-pixels are configured with a plurality of different exposure times;
a first sub-pixel of the M×N sub-pixels is configured with a first exposure time and a first analog gain, and a second sub-pixel of the M×N sub-pixels is configured with a second exposure time and a second analog gain, wherein the first exposure time is longer than the second exposure time, and the first analog gain is smaller than the second analog gain; and
the first sub-pixel and the second sub-pixel have same energy, which is computed as a product of exposure time and analog gain.

2. The M×N-cell image sensor of claim 1, wherein:
the first sub-pixel is selected from the M×N sub-pixels except for a sub-pixel with a shortest exposure time among the M×N sub-pixels.

3. The M×N-cell image sensor of claim 1, wherein:
the first sub-pixel is a sub-pixel with a second shortest exposure time among the M×N sub-pixels, and the second sub-pixel is a sub-pixel with a shortest exposure time among the M×N sub-pixels.

4. The M×N-cell image sensor of claim 3, wherein:
the first exposure time of the first sub-pixel is m times greater than the second exposure time of the second sub-pixel, wherein m is an integer greater than one, and the first analog gain of the first sub-pixel is configured as $$\frac{1}{m}th$$

of the second analog gain of the second sub-pixel.

5. The M×N-cell image sensor of claim 1, further comprising a processor configured to:
accumulate pixel values of the first sub-pixel and the second sub-pixel to obtain an intermediate pixel value, thereby detecting different flicker positions through different exposure times.

6. The M×N-cell image sensor of claim 5, wherein the processor is further configured to:
perform High Dynamic Range (HDR) fusion of the intermediate pixel value and pixel values of other M×N sub-pixels when flicker is not detected.

7. The M×N-cell image sensor of claim 5, wherein the processor is further configured to:
perform LED flicker mitigation (LFM) during HDR fusion of the intermediate pixel value and pixel values of other M×N sub-pixels when a flicker is detected.

8. The M×N-cell image sensor of claim 1, wherein the M×N sub-pixels are configured with linearly increasing exposure times.

9. The M×N-cell image sensor of claim 1, wherein, except for the first sub-pixel, all other sub-pixels in the M×N sub-pixels are configured with the second analog gain.

10. An LED flicker mitigation (LFM) method, comprising:

capturing High Dynamic Range (HDR) frames by using an M×N-cell image sensor, M and N being positive integers greater than one, wherein:

the M×N-cell image sensor comprises a plurality of pixels, each pixel being divided into M×N sub-pixels, and within each of the plurality of pixels:

the M×N sub-pixels are configured with a plurality of different exposure times; and a first sub-pixel of the M×N sub-pixels is configured with a first exposure time and a first analog gain, and a second sub-pixel of the M×N sub-pixels is configured with a second exposure time and a second analog gain, wherein the first exposure time is longer than the second exposure time, the first analog gain is smaller than the second analog gain, and the first sub-pixel and the second sub-pixel have same energy, which is computed as a product of exposure time and analog gain;

detecting LED flickering based on accumulating a pixel value of the first sub-pixel and a pixel value of the second sub-pixel in the M×N sub-pixels; and in response to LED flickering being detected, performing LED flicker mitigation (LFM) during HDR fusion of the HDR frames.

11. The LFM method of claim 10, wherein:

except for the first sub-pixel, all other sub-pixels in the M×N sub-pixels are configured with the second analog gain.

12. The LFM method of claim 10, wherein:

the first sub-pixel is a sub-pixel that has a second shortest exposure time among the M×N sub-pixels, and the second sub-pixel is a sub-pixel with a shortest exposure time among the M×N sub-pixels.

13. The LFM method of claim 12, wherein:

the first exposure time of the first sub-pixel is m times greater than the second exposure time of the second sub-pixel, wherein m is an integer greater than one, and the first analog gain of the first sub-pixel is configured as $$\frac{1}{m}th$$

of the second analog gain of the second sub-pixel, wherein the pixel value of the first sub-pixel is determined based on the first exposure time and the first analog gain, and the pixel value of the second sub-pixel is determined based on the second exposure time and the second analog gain.

14. The LFM method of claim 10, wherein the performing LFM during fusion of the HDR frames comprises:

performing LFM at pixels that captured the LED flickering, and performing HDR fusion at pixels that did not capture the LED flickering.

15. The LFM method of claim 10, wherein the M×N sub-pixels are configured with linearly increasing exposure times.

16. A non-transitory computer-readable storage medium configured with instructions executable by one or more processors to cause the one or more processors to perform operations comprising:

capturing High Dynamic Range (HDR) frames by using an M×N-cell image sensor, M and N being positive integers greater than one, wherein:

the M×N-cell image sensor comprises a plurality of pixels, each pixel being divided into M×N sub-pixels, within each of the plurality of pixels:

the M×N sub-pixels are configured with a plurality of different exposure times; and a first sub-pixel of the M×N sub-pixels is configured with a first exposure time and a first analog gain, and a second sub-pixel of the M×N sub-pixels is configured with a second exposure time and a second analog gain, wherein the first exposure time is longer than the second exposure time, the first analog gain is smaller than the second analog gain, and the first sub-pixel and the second sub-pixel have same energy, which is computed as a product of exposure time and analog gain;

detecting LED flickering based at least on accumulating a pixel value of the first sub-pixel and a pixel value of the second sub-pixel in the M×N sub-pixels; and based on the detected LED flickering, performing LED flicker mitigation (LFM) during HDR fusion of the HDR frames.

17. The non-transitory computer-readable storage medium of claim 16, wherein the first sub-pixel is selected from the M×N sub-pixels except for a sub-pixel with a shortest exposure time among the M×N sub-pixels.

18. The non-transitory computer-readable storage medium of claim 16, wherein the first sub-pixel is a sub-pixel with a second shortest exposure time among the M×N sub-pixels, and the second sub-pixel is a sub-pixel with a shortest exposure time among the M×N sub-pixels.

19. The non-transitory computer-readable storage medium of claim 18, wherein:

the first exposure time of the first sub-pixel is m times greater than the second exposure time one of the second sub-pixel, and the first analog gain of the first sub-pixel is configured as $$\frac{1}{m}th$$

of the second analog gain of the second sub-pixel.

* * * * *